US012381886B1

(12) United States Patent
Brandwine et al.

(10) Patent No.: US 12,381,886 B1
(45) Date of Patent: Aug. 5, 2025

(54) EVALUATION CRITERIA FOR MEDIA AUTHENTICITY ANALYSIS SERVICE

(71) Applicant: Amazon Technologies, Inc., Seattle, WA (US)

(72) Inventors: Eric Jason Brandwine, Haymarket, VA (US); Jennifer Anne Brinkley, Portland, OR (US); Min Lee Hyun, Lorton, VA (US); Mark Becker, Potomac, MD (US)

(73) Assignee: Amazon Technologies, Inc., Seattle, WA (US)

( * ) Notice: Subject to any disclaimer, the term of this patent is extended or adjusted under 35 U.S.C. 154(b) by 1051 days.

(21) Appl. No.: 16/588,988

(22) Filed: Sep. 30, 2019

(51) Int. Cl.
| | |
|---|---|
| *G06F 16/41* | (2019.01) |
| *G06F 16/483* | (2019.01) |
| *G06V 10/74* | (2022.01) |
| *G06V 20/40* | (2022.01) |
| *H04L 9/40* | (2022.01) |

(52) U.S. Cl.
CPC .............. *H04L 63/12* (2013.01); *G06F 16/41* (2019.01); *G06F 16/483* (2019.01); *G06V 10/761* (2022.01); *G06V 20/48* (2022.01)

(58) Field of Classification Search
CPC ....... H04L 63/12; G06F 16/41; G06F 16/483; G06V 10/761; G06V 20/48
See application file for complete search history.

(56) References Cited

U.S. PATENT DOCUMENTS

| | | | |
|---|---|---|---|
| 10,303,945 B2 | 5/2019 | Aoyama et al. | |
| 2007/0172155 A1 | 7/2007 | Guckenberger | |
| 2007/0230794 A1 | 10/2007 | McAlpine et al. | |
| 2015/0256877 A1 | 9/2015 | Yoneda et al. | |
| 2016/0012047 A1* | 1/2016 | Houh | G06F 16/7844 707/723 |
| 2016/0045829 A1* | 2/2016 | Myslinski | G06F 11/3065 463/29 |
| 2018/0077440 A1* | 3/2018 | Wadhera | H04N 21/8456 |
| 2019/0073520 A1* | 3/2019 | Ayyar | G06V 40/173 |
| 2019/0236614 A1* | 8/2019 | Burgin | G06V 10/764 |
| 2019/0238952 A1* | 8/2019 | Boskovich | H04N 21/858 |
| 2021/0120283 A1 | 4/2021 | Zhu et al. | |

* cited by examiner

*Primary Examiner* — Yuk Ting Choi
(74) *Attorney, Agent, or Firm* — Davis Wright Tremaine LLP

(57) ABSTRACT

Systems and methods directed to a service that analyzes media and outputs a confidence score of the media based on inconsistencies within media and differences between source media and the media, are described herein. In one aspect, a media file may be obtained at a computing resource service provider. The media file may be analyzed using at least one of a plurality of functions to generate media results that indicate inconsistencies within the media file, and/or differences between the media file and corresponding media registered with the computing resource service provider or contextual media that contains similar content to the media file, where individual functions of the plurality of functions are executed in parallel by at least one compute unit. A confidence score, which indicates a significance of the inconsistencies within the media file and/or differences from the registered or contextual media, may be generated based on the media results.

17 Claims, 10 Drawing Sheets

EVALUATION CRITERIA FOR MEDIA AUTHENTICITY ANALYSIS SERVICE

BACKGROUND

The capabilities of neural networks and other artificial intelligence mechanisms are increasing rapidly. Computers are now able to produce realistic media content quickly and efficiently, replacing manual techniques that often involved many hours of manual editing. Media produced by computers is often difficult to distinguish from media capturing real-life scenes. Accordingly, the potential for misuse is increasing. In parallel, tools and techniques for modifying media are becoming more wide spread and more powerful, adding to the difficulty in determine if media is authentic, or if it has been modified in a significant way to change the reality it captures or message it conveys.

BRIEF DESCRIPTION OF THE DRAWINGS

Various techniques will be described with reference to the drawings, in which.

DETAILED DESCRIPTION

Figure 1:
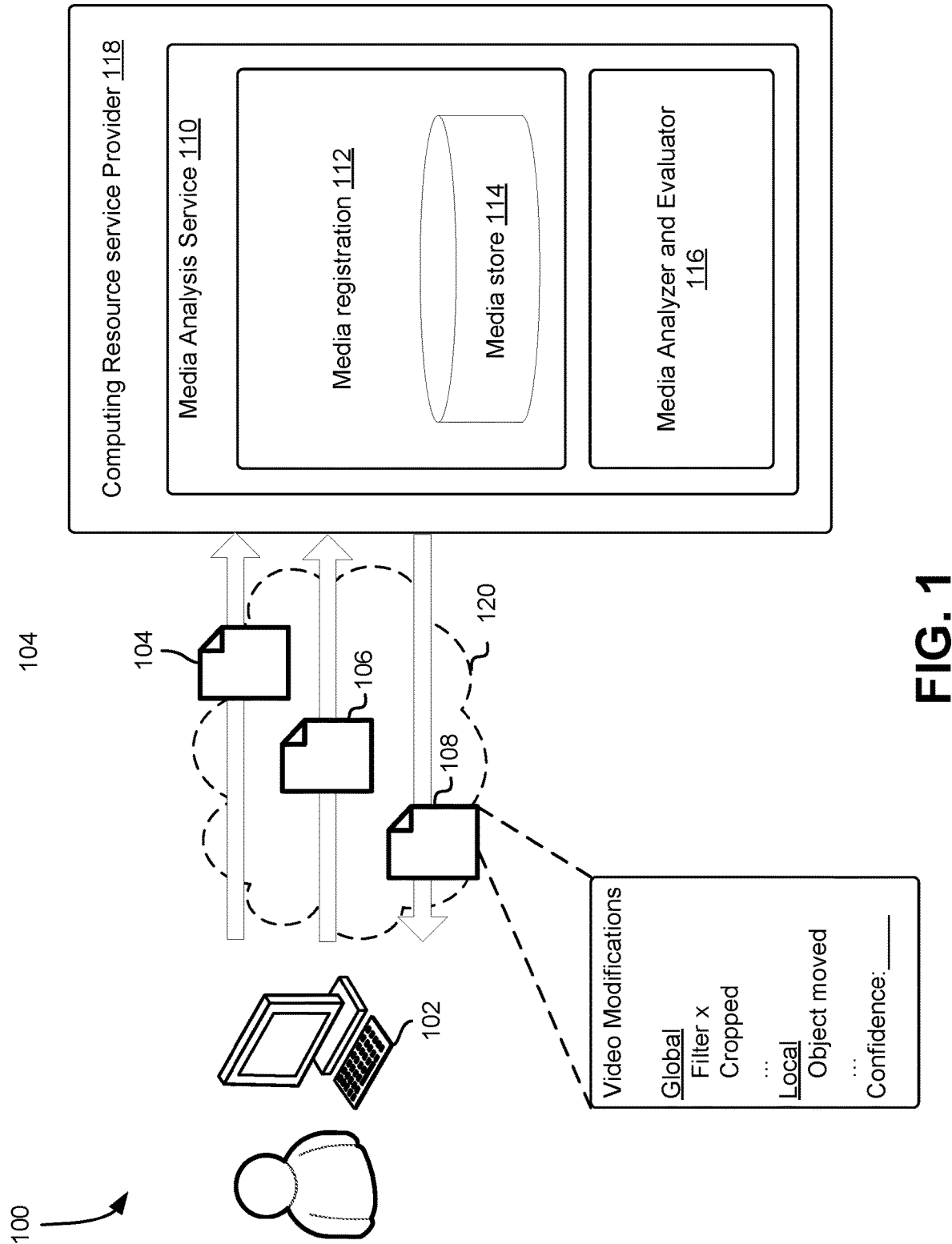
FIG. 1 illustrates an example environment where source media may be registered and supplied media may be analyzed by a media analysis service to determine if it has been modified and the significance of those modifications.

The following disclosure describes systems and techniques for detecting whether media, such as images, video, audio, etc., has been modified and generating an indication of the significance of those modifications. In some cases, various functions may be used to analyze the media. The results of the analysis may then be compiled to generate an indication of the significance of any changes made to the media such as through a confidence score, relating to inconsistences within the media itself, and/or compared to source media, such as may be registered by a trustworthy source. In some cases, the confidence score may be determined based on an analysis of whether a prominent figure or object has been detected in the media, and whether the figure or object has similar characteristics when compared to other media containing the same figure or object. Various changes and inconsistencies of the media may be correlated to significance of those changes and inconsistencies using rule schemas and/or the trained models to generate a confidence score.

In some aspects, a computing resource service provider may obtain media, such as via one or more media files, to analyze. In some aspects, the media may be received directly from a user or client device, upon a specific request. In other cases, the media may be obtained by detecting that media has been electronically published at one or more locations, and/or when the media is accessed. Based on the type of media or other attributes of the media itself, one or more functions of a set of functions may be selected to analyze the media. The media may be analyzed according to the selected functions, for example by sending the media, the function, and parameters for each function to use in evaluating the selected functions to a function execution service. The functions may include a warp detector function, a cropping detector function, filter detection functions, object detector and recognizer functions, and so on. In some cases, individual functions of the set of functions may be evaluated in parallel, such as where the functions are executed by different software containers or different virtual machines instances. The selected functions may operate independently of one another, or in some cases, some functions may be dependent upon the output of another function. The selected functions may output media results that indicate inconsistencies within the media file. The output media results may be obtained by one or more models, and based on the media results, a confidence score, which indicates a significance of the inconsistencies within the media file, may be generated or compiled and provided in response to the request.

In some cases, the computing resource service provider may provide a media registration service that enables sources to register the media with the service provider, to aid in identifying modified or falsified media. In this scenario, the media to be analyzed may be compared to registered source media to determine differences between the source media and the provided media. The differences may then be used by one or more models in generating the confidence score. In other aspects, when source media corresponding to the provided media is not registered, source media may be obtained by searching publicity available media across various websites, publications, etc. The obtained source media may then be compared to the provided media, in a similar way as described above, and used as an input to generating a confidence score for the supplied media.

In some cases, the results of the analysis may be provided through a graphical user interface, such as provided on top of a web browser. In this example, the analysis and display of the results may be enabled in the web browser, where the confidence score and/or visual indications of the changes and inconsistencies within the media may be overlaid on top of the media, to aid in efficient communication of the analysis behind the confidence score. In other cases, a more detailed view of the analysis and confidence score may be generated in a graphical user interface, such that the source media, the supplied media, and an annotated version of the media are provided, where the annotated media indicates the differences and inconsistencies within the supplied media.

In some aspects, various scores may be determined and then combined to generate a confidence score. For example, at least one of a number, type, or area of impact (e.g., in space, temporal space for video, etc.) of at least one inconsistency within the media file may be determined. Using machine learning techniques, these inconsistencies, and the attributes thereof, may be used to generate an artifact score that indicates how those inconsistencies affect the overall meaning of the message conveyed by the media, such as whether a subject has been altered, or other information of the media has been distorted and the extent to which it may be misleading as to the underlying reality captured by the media.

In another example, an archival score may be generated based on differences determined between a source media and a supplied media. In yet some examples, a subject in the media may be detecting, recognizing, and identified. The identified subject, such as a prominent individual, as portrayed in the supplied media may then be compared to the same subject in at least one other media, such as found via other sources (e.g., contextual media). The occurrences of the subject across multiple media may be compared, and an identification score may be generated that indicates to what extent the subject in the supplied media matches characteristics of the same subject in other media. In yet some examples, a location or address of the first publication and/or subsequent publications of the media may be determined. This may include various new media sources, social media, etc. A provenance history or record may then be determined or compiled based on the determined location(s), and provided with the confidence score to better inform a customer of the history of the media to enable the customer to make their own judgements concerning the media.

In some aspects, the described techniques may be particular suited for detecting deep fakes in image or video media. This may include detecting superimposition, where a person's face is placed on the body of another known individual; a recognizable person in newly disclosed image or video, where a person's face appears in an unknown video or photo, such as an on original video being created that incorporates someone else's face; merged faces, where a video or photo merges two faces together, while still resembling the originally featured individual by, for example, subtle editing around the mouth, eyes, and nose, or altering lip movements to make it appear that an individual is saying something that was never in fact said; and/or other modifications to media.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) increased detection of altered media including deep fakes, provided in a shorter time period (2) increased and more efficient access to analysis of altered media, among other benefits and advantages, as will be described throughout the disclosure.

FIG. 1 illustrates an example environment 100 where source media may be registered and supplied media may be analyzed by a media analysis service 110 to determine if it has been modified and the significance of the modifications. In some aspects, the media analysis service 110 may be provided as a service by a computing resource service provider 118. In some examples, the computing resource service provider 118 may be an entity that provides one or more computing resource services to its customers individually or as a combination of services of a distributed computer system. The computing resource service provider 118 may include a collection of physical and/or virtual computing devices and systems, including physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices, including both directional and omni-directional or non-directional media (such as hard drives, optical drives, solid state devices, virtual storage devices such as provided by the computing resource service provider, and the like), services (e.g., such as those accessible via application programming interface calls, web service calls, or other programmatic methods), and the like. Examples of types of computing resources provided by the computing resource service provider 118 include infrastructure-as-a-service (IaaS), platform-as-a-service (PaaS), and/or software-as-a-service (SaaS). The one or more computing resource services of the computing resource service provider 118 may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider 118, such as the customer 102, may communicate with one or more of the services, such as the media analysis service 110, via an interface, which may be a web services interface or any other type of customer interface over a network 120. Each service provided by a computing resource service provider 118 may have its own interface, and subsets of the services may have corresponding individual interfaces in addition to, or as an alternative to, a common interface. The customer 102 may communicate with the computing resource service provider 118 through a network 120, whereby the network 120 may be a communication network, such as the Internet, an intranet, an internet service provider (ISP) network and/or some other such network. Some communications from the customer device 102 to the media analysis service 110, as described below, may cause the media analysis service 110 to operate in accordance with one or more embodiments described or a variation thereof.

Various communications to/from the customer 102 may be orchestrated by a browser or other application executing on the customer 102. In an embodiment, the customer 102 communicates to the media analysis service 110 through one or more application programming interfaces (API). In some examples, an application programming interface may be a set of subroutine definitions, communication protocols, and/or software tools that provide a method of communication from the customer 102 and the media analysis service 110.

In an embodiment, the customer 102 is any entity operable to access systems such as the media analysis service 110. In some examples, the customer 102 is an individual, group of individuals, business entity or other organization that has a business relationship with the computing resource service provider 118. In the present disclosure, it is contemplated that use of the term "customer" can include a computing device (also referred to as a "client device") used to perform operations under the control of or on behalf of the customer (e.g., to access a service 110 provided by the computing resource service provider 118). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a customer-accessible virtual machine hosted on one or more computer servers, or other computing system capable of communicating with a service provided by the computing resource service provider. In some examples, a "service" refers to an executing computer application that provides functionality to another computer application.

As illustrated, the media analysis service 110 may include a collection of physical and/or virtual computing devices, including hardware or software-based storage devices that host or provide a media registration process or component 112 and a media analyzer and evaluator process or component 116. The media registration process or component 112 be any computing resource or collection of such resources capable of interacting with other components of the computing resource service provider 118, so as to orchestrate and execute registration of source media.

Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., via application programming interface calls, web service calls, or other programmatic methods), databases (which may be implemented on one or more of the foregoing examples), and the like.

The media registrations component 112 may obtain various media, including images, video, audio, text, other media, or combinations thereof, such as media 104 from client device 102 or from various other sources (e.g., detecting when media is published across various networks). The media registration component 112 may also obtain and/or derive metadata associated with the media, including but not limited to source information, capture device information, timestamp information, tag information, and so on. The media registration component 112 may register this media with a source or customer account and store the media and metadata in a media store 114, such as in a customer media escrow account. In an embodiment, the media store 114 is a data storage volume such as, for example, a magnetic disk drive (e.g., a spinning disk drive or a solid state disk drive), computer system memory, magnetic tape, or some other optical storage device. In another embodiment, the media stores 114 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the media stores 114 described herein are illustrative examples and other types of data storage volumes used for the media stores 114 may be considered as within the scope of the present disclosure. In some aspects media store 114 may be provided by a data storage service of the computing resource service provider 118.

In some cases, the media registration component 112 may create and store a digest or other representation of source media, for example, to conserve data storage resources, where storage and maintenance of the original source media may be the responsibility of the customer. In this example, the media registration component 112 may generate a hash of the media and store the hash, for future comparisons with other media to determine authenticity/whether changes have been made to the media. In some cases, the source media may have one or more characteristics that are more readily detectable, in the example where a fake or modified image is then compared to the source. This may include characteristics of the media capture device itself. These unique characteristics may be captured when a hash is produced of the source media. In other cases, insignificant modifications may be performed on the media (such as by inserting pixels according to a certain function, creating a watermark, etc., for images and video, that may not be detectable by the human eye), before hashing, to make it easier to detect if future supplied media has been altered from the source. In some aspects, the media registration component 112 may generate a cryptographic hash, using any of a variety of known techniques, of one or more characteristics of the source information or other metadata. In any of these cases, the modified media may be returned to the customer, and the customer may then use the modified media in place of the original media for publishing. In this way, it may be more difficult for others to copy and modify the media, either without showing the source inadvertently (e.g., not being able to remove a watermark), or making it much easier to detect if the media has been modified, by making the source have unique characteristics, the modifications of which, may be easy to detect. (e.g., upon hashing the supplied media). In some cases, these modifications may include systematic or uniform changes (e.g., according to a uniform distribution), such as insertion of pixels into the media, or may include more localized or directed changes to the media (e.g., in areas where cropping or other distortions are likely to occur, such as faces). These modifications, in some examples, may be intentionally imperceptible to the human eye, to enable publishing the "signed" media without being readily detected. This may include using stenography techniques, as may be known in the art, to implant undetectable artifacts in various media.

The media analyzer and evaluator 116 may include one or more processes or computing devices that execute functions to analyze and evaluate media. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., via application programming interface calls, web service calls, or other programmatic methods), databases (which may be implemented on one or more of the foregoing examples), and the like.

In some aspects, the media analyzer and evaluator 116 may utilize instantiate and provision one or more virtual computing instances to perform analysis on the media, for example, via a number of different functions. In some aspects, this may be facilitated through a virtual computing instance service. As used herein, the term "virtual machine" refers to an emulation, in software and/or hardware of a physical computer system, such that software executing in the virtual machine environment behaves as if the virtual machine were a physical computer. The virtual machine may include various virtual computer components, such as one or more virtual processors, virtual memory, or other virtual devices. The virtual processors, virtual memory, and/or other virtual device(s) may emulate a physical analogue while utilizing a share of one or more of the host computing device's physical processors, memory, or other devices to perform respective virtual functions.

In some examples, the media analyzer and evaluator 116 may utilize one or more software containers, such as provided by a container management service, to analyze the media in place of or in addition to a function execution service. A container or software container, as referred to herein, may include code and all its dependencies such that an application (also referred to as a task) can run quickly and reliably in an isolated computing environment. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of software containers, a task refers to a container, or multiple containers working together, running to execute the functionality of a software application or a particular component of that application. In some implementations, tasks can also include virtual machines, for example virtual machines running within an instances that hosts the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced. Containers and the isolation thereof may be managed through application programming interface ("API") calls as described herein.

A container management service may be a collection of computing resources that operate collectively to process task definitions to perform tasks (e.g., one or more media analysis functions) as described herein by providing and managing tasks and compute instances where the tasks and the associated containers can be executed. The computing resources configured to process task definitions and provide and manage compute instances where the tasks and the associated containers can be executed include at least one of: computer systems (the computer systems including processors and memory), networks, storage devices, executable code, services, processes, modules, or applications. The computing resources configured to process task definitions and provide and manage compute instances where the tasks and the associated containers can be executed may include virtual systems that are implemented on shared hardware hosted by, for example, a computing resource service provider. The container management service may be implemented as a single system or may be implemented as a distributed system, with a plurality of instances operating collectively to process task definitions and provide and manage compute instances where the tasks and the associated containers can be executed. The container management service may operate using computing resources (e.g., other services) that enable the container management service to receive task definitions, instantiate compute instances, communicate with compute instances, and/or otherwise manage compute instances.

In some aspects, the media analyzer and evaluator 116 may utilize or call a function execution service or serverless compute service to analyze media using a variety of different functions. A serverless compute service may be serverless in the sense that computing resources are dynamically allocated to perform functions (also referred to as serverless compute functions, serverless functions, Lambda functions) triggered by the events such as invocation of an endpoint from a client (e.g., a web API call via a network such as the Internet), or via the media analyzer and evaluator 116.

In any of the above cases, the media analyzer 116 may select a subset of available functions to analyze the media based on one or more attributes of the media, such as based on media type or whether source media is available. The media analyzer and evaluator 116 may then generate a confidence score or other metric that indicates a significance of inconsistences within the media and/or differences between supplied media and provided media, such as media 106. The ways in which the media analyzer analyzes and evaluates media will be described in greater detail below in reference to FIGS. 2 and 3.

As illustrated, the media analysis service 110 may receive or obtain source media 104, for example from a client computing device 102. The source media 104 may include one or more image, video, audio, text, and/or other form of media. In some aspects, an actual copy of the media may be obtained by media service 110. In other cases, the media 104 may made available to the media analysis service 110, such as via a link or address of the media 104. In other cases, source media 104 may be obtained by the media analysis service 110 via monitoring known publication locations, news feeds, etc., for source media, without requiring the customer 102 to identify the media. Upon receiving source media 104, the media registration component 112 may search for media relating to the source media 104 in media store 104. If no duplicative media is found, the media registration component 112 may obtain or derive metadata associated with the media 104 (source information, media capture device information, etc.) and store the media and metadata in the media store 114 associating it with a customer or source account (e.g., a news service, a social media account, an individual, etc.). In some cases, as described above, a digest of the source media 104 may be generated and stored, which may further be based on metadata of the source media, and stored in addition to or in place of source media 104. Once registered with the media registration component 112, the media may then be used, as source media, for comparisons with provided media, by the media analysis service 110 to analyze and evaluate media for consistency with the source media, as will be described in greater detail below.

Either the same client 102, or a different client, or the media analysis service 110 on its own, may then obtain supplied media 106. Supplied media 106 may again take any of a variety of forms, including but not limited to images, video, audio, text, etc. The media analysis service 110 may direct the supplied media 106 to the media analyzer and evaluator 116, for example, based on a request to analyze the media 106. The media analyzer and evaluator 116 may access the media store 114 to determine if similar media, such as source media corresponding to the supplied media 106, has been registered with the media analysis service 110. If source media corresponding to the supplied media has been registered, the media analyzer and evaluator 116 may call one or more functions to compare the two media to determine the differences between the media.

The media analyzer and evaluator 116 may also call a number of functions to analyze inconsistencies with the supplied media 106 itself, such as cropping, irregular pixels, mismatched audio to video and the like. These and other functions may be utilized to analyze the media 106. The media analyzer and evaluator 116 may then compile the results from the one or more different analyses and input those results into one or more models, such as a confidence classifier. The confidence classifier or other model may then determine, based on rules, neural networks, and the like, whether the differences and inconsistences are significant, for example based on a comparison with historical data, to generate a confidence score of the media. The media analyzer and evaluator 116 may then output these results 108 in various forms, in response to the request to the client 102. Different graphical examples of output the results will be described in greater detail below in reference to FIGS. 4 and 5.

In some cases, various clients of the media analysis service 110 may configure the service 110 to periodically search for and obtain media from one or more specified sources. The media analysis service 110 may then provide the analyses and evaluation results, such as via a confidence score, through a web browser or other similar interface to alert the client and/or other users of the confidence in certain published media.

In yet some examples, a customer 102 may obtain media. Before publishing the media, say in the example of a customer who is a news company, the customer 102 may wish to have the media analysis service 110 analyze the media to ensure that it is not fake or has been falsified. The media analysis service 110 may analyze the media for inconsistencies and in other ways to determine if the media meets a configurable threshold of truthfulness (e.g., that it has not been modified in a misleading way), and return the results to the customer 102, to enable the customer to determine if the media meets its own requirements for publication. In further examples, the media analysis service 110 may be used to provide a record of verified or registered media of a particular individual or of an event to provide a source for truth relating to the occurrence of the event or an individual's action, whereabouts, etc., relative to timestamps of individual pieces of media, and so on, for evidentiary proposes.

Figure 2:
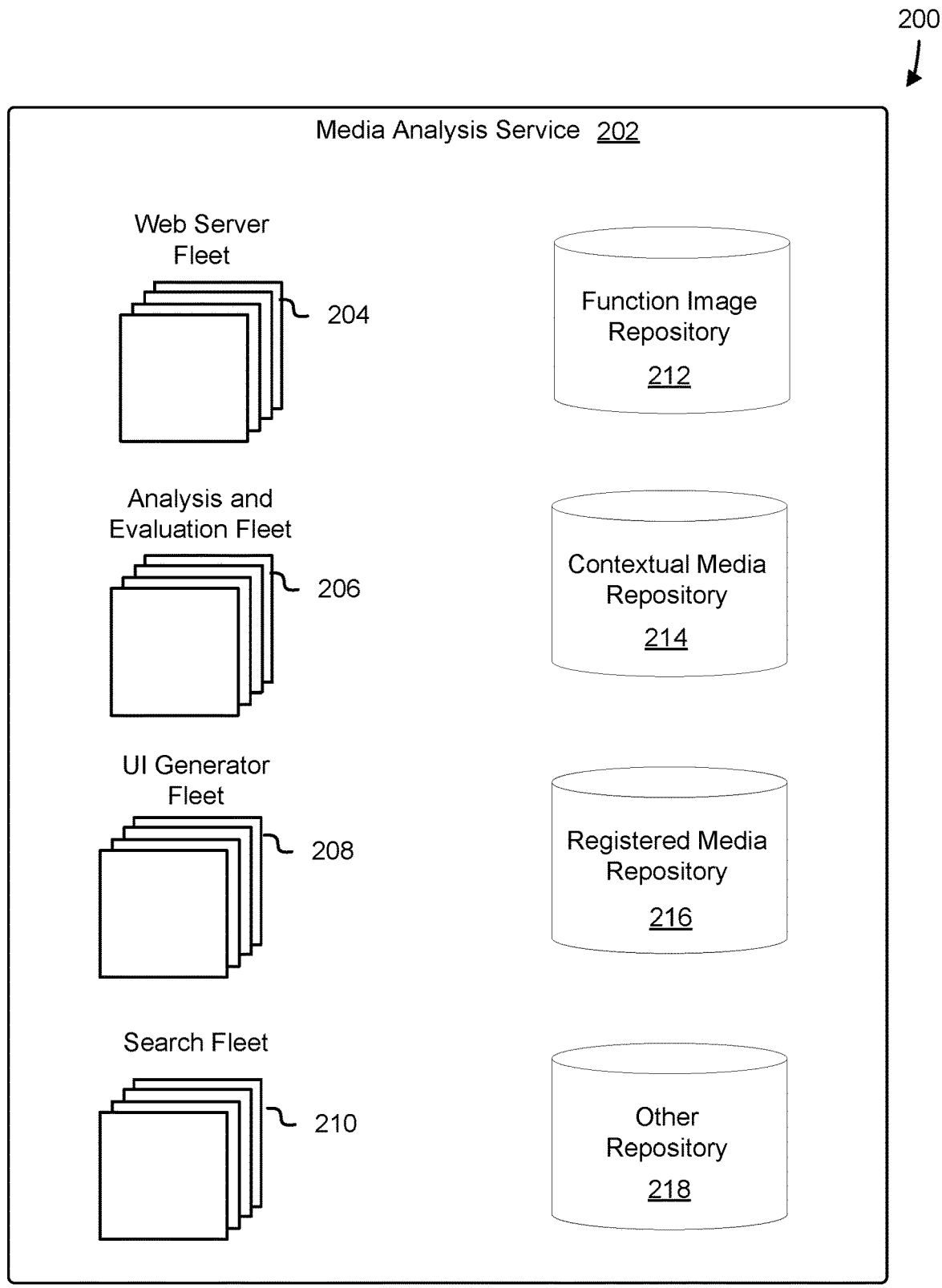
FIG. 2 illustrates a more detailed example of the media analysis service of FIG. 1.

FIG. 2 illustrates a more detailed example 200 of the media analysis service 202, which may include one or more aspects of the media analysis service 102 described above in reference to FIG. 1. In the example illustrated, the media analysis service 202 may include a number of computing devices, virtual machines, or fleets thereof, including a web server fleet 204, an analysis and evaluation fleet 206, a user interface (UI) generator fleet 208 and a search fleet 210. The various fleets may interact with various data storage devices or systems, including a function image repository 212, a contextual media repository 214, a registered repository 216, and other repository 218. The interactions and functions of the various fleets and repositories will be described in turn, below.

In some aspects, one or more of fleets 204-210 may include one or more virtual machines or instances that are configured to run and launch containers. In some aspects, the number of virtual machines utilized by each fleet, and/or the number of containers, may scale based on request volume, so as to conserve resources. In the example illustrated, the web server fleet 204 may receive all incoming media analysis requests and media registrations requests. For registration, the web server fleet 204 may obtain metadata of the source media and store the media and metadata associated with an account in the registered media repository 216. In some aspects, the web server fleet 204 may generate or derive metadata from the source media, and/or generate a hash or other verifiable representation of the media for registration in addition to or in place of the actual media. The registered media repository 216 may include one or more aspects of media store 114 described above. Upon successfully registering media, the web server fleet 204 may generate and send a response to a customer request indicating the media has been registered.

The web server fleet 204, upon receiving supplied media, for example in a request to analyze the media, may send the supplied media to the analysis and evaluation engine 206, which may instruct the search fleet 210 to search for related media, including whether media matching in a number of attributes of the supplied media has been registered and is stored in the registered media repository 216.

Additionally or alternatively to searching in the registered media repository 216, the search fleet 210 may also search within the contextual media repository 214 for related media. In this scenario, the analysis and evaluation fleet 206 may access one or more functions from the function image repository 212, as will be described in greater detail below, to generate metadata and other information related to the supplied media. In some cases, the metadata may be supplied with the media itself (e.g., identifiers of objects in the media, timestamp information, event information, resolution information, etc.). In other examples, the analysis and evaluation fleet 206 may call a segmentation function, an object detection function, and an object identifier or recognizer function to identify objects with the supplied media. The respective functions may return the results (e.g., identified objects) to the analysis and evaluation fleet 206, which may send the results and metadata supplied with the media to the search fleet 210, which may search within the contextual media repository 214 for media related to the supplied media. The contextual media repository 214 may contain various media that has been identified as having a number of attributes, such as a subject (identification of one or more individual, such as prominent people), events (e.g., a holiday parade or international event, etc.), time stamp, source, source capture device, first publication venue or location, or a variety of other attributes. These attributes may be associated with the metadata stored with media stored or accessed via the contextual media repository 214. As such, the search fleet 210 may search the contextual media repository 214 for media having one or more similar attributes, and return any such media to the analysis and evaluation fleet

206. This information may then be relayed to the appropriate function and a result of a media comparison may be generated.

The analysis and evaluation fleet 206 may additionally or alternatively instruct the search fleet 210 to search for related media published in locations, news feeds, social media, etc., that is not known or maintained by the media analysis service 202. This may include a similar process as described above for searching for contextual media, and/or may include image or audio searches based on the actual underlying media, as are known in the art. Upon receiving any related and/or source media, the analysis and evaluation fleet 206 may compile the results and select which functions of a plurality of functions stored in the function image repository to use to analyze the media.

In some embodiments, the function image repository 212 may store a number of functions that are hosted and can be executed by a function execution service. In several embodiments, a compute function is code that is uploaded to the function execution service and associated with one or more triggers or instructions to execute the function. For example, a trigger could be a request to the function execution service to run the function, from the analysis and evaluation fleet 206, or the trigger could be set on an event generated by the function execution service or another service. Example analysis functions and evaluation functions, the images of which may be stored in the function image repository 212, will be described below in reference to FIG. 3.

In an embodiment, the analysis and evaluation fleet 206 may instruct a service such as a serverless compute service provided by a computing resource service provider, such as provider 118 described above in reference to FIG. 1, to launch and perform various functions to analyze and evaluate media. Examples of serverless compute services include AWS Lambda, Google Cloud Functions, IBM Cloud Functions, Fn or Fn Project, platform-as-a-service service providers, and more. A serverless compute service may be serverless in the sense that computing resources are dynamically allocated to perform functions (also referred to as serverless compute functions, serverless functions, Lambda functions) triggered by the events such as invocation of an endpoint from a client (e.g., a web API call via a network such as the Internet). In an embodiment, a serverless compute function is triggered when a serverless compute endpoint is invoked and computing resources in which the function can run are provisioned in response to the trigger being detected. Note, however, that embodiments of the present disclosure need not be limited to use with serverless compute services, but may also be implemented on some other virtual and/or physical computing service platform, such as a software container service or virtual computer system service. The computing unit or resources utilized may be in accordance with a computing environment that is suitable to execute the function. The computing resources can be physical, which may include physical server computers, or virtual, which may include virtual machines. For example, if the function being triggered is written in the Java programming language, the serverless compute service may allocate a Java Virtual Machine as the resource to run the coded function.

In some aspects, individual functions stored in the function image repository 212 may be accessed and performed in parallel or otherwise overlapping in time, by one or more compute units. As used herein a computer unit may include a physical computing device or portion thereof, including a central processing unit, a graphical processing unit, or other hardware, such as purpose specific hardware. In other cases, a compute unit may refer to virtualized computing resources, such as one or more virtual machine instance, a software container, etc. In some cases more than one function may be performed by one compute unit, and another one more functions may be performed or executed by another compute unit. In some cases, each function being executed may correspond and be executed by a separate compute input. In some examples, dependent functions may be performed in parallel by different compute units, or depending on complexity of the function, may be performed by one compute unit to reduce delay and resources used in communicating results of one or more functions between different compute units.

In an embodiment, analysis and evaluation fleet 206 invokes functions of the function image repository 212 via API calls to perform specified workflows. API calls for different functions may vary, but generally, API calls will typically include the name of the function or function itself, the media, and in some cases, one or more additional parameters related to the function or metadata associated with the media, including other media to be compared with the supplied media. Each of the functions may comprise one or more operations; these operations may require the usage of various services and/or other data, such as metadata. In an embodiment, each function comprises the performance of one or more operations, and generation and/or storage of the state of the function following the performance of the one or more operations (e.g., the results of the function). In various embodiments, the state of each function or results, herein after referred to as media results, may be sent back to the analysis and evaluation fleet 206. In some aspects, one function of the function image repository 212 may be dependent on another function, such that a first function may be configured to send its results (or the analysis and evaluation fleet may direct the results) to a second function of the function image repository 212 to be used as an input to the second function. It should be appreciated that other dependency relationships are contemplated herein.

In some aspects, the results of the various analysis functions may be sent to one or more evaluation functions, which may also be stored in the function image repository 212. The one or more evaluation functions may combine the results of the analysis functions to generate a composite evaluation or confidence score, as will be described in greater detail below, in reference to FIG. 3. The confidence score or other similar indication may be sent to the analysis and evaluation fleet 206, which may then forward the results onto a customer. In some cases, the analysis and evaluation fleet may compile one or more scores generated by various evaluation functions.

In some cases, the results of the analysis functions and/or evaluation functions may be sent to the UI generator fleet 208, either directly from the functions themselves (as indicted in the function definition maintained in the function image repository 212) or through the analysis and evaluation fleet 206. The UI generator fleet 208 may then generate one or more indications of the results of the analysis functions (e.g., inconsistencies within the media, differences between the media and registered or unregistered source media, etc.) and generate a user interface to display the results and provide the confidence score. In some aspects, the UI generator fleet 208 may generate one or more visual indications of the analysis results and provide those through a graphical user interface, such as interfaces 400 and 500 described below in reference to FIGS. 4 and 5.

In some aspects, one or more other repositories 218 may be utilized and accessed by one of fleets 204-210 to generate metrics relating to the media analysis service, to provide or reference billing functionality, and so on.

Figure 3:
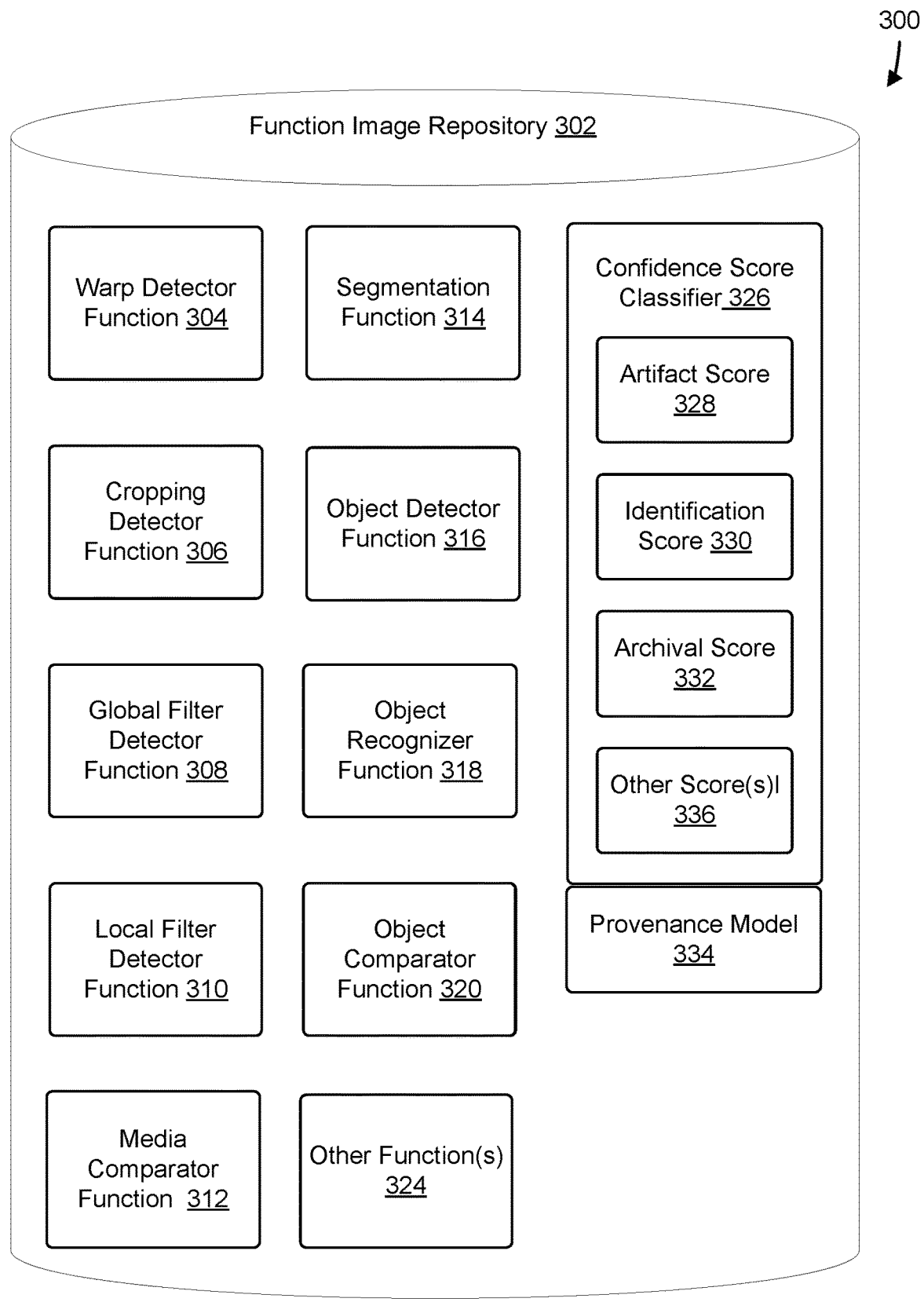
FIG. 3 illustrates an example repository of image analysis functions and confidence score classifiers that may be utilized to determine if media has been modified and the significance of those modifications.

FIG. 3 illustrates a more detailed example 300 of a repository of image analysis functions and confidence score classifiers 302, which may include one or more aspects of the function image repository 212 described above in reference to FIG. 2, that may be utilized to determine if media has been modified and the significance of the modifications. Function image repository 302 may include any of a number of image analysis functions or models, such as a warp detector function 304, a cropping detector function 306, a global filter detector function 308, a local filter detector function 310, a media comparator function 312, a segmentation function 314, an object detector function 316, an object recognizer function 318, an object comparator function 320, and/or various other functions 324 as may already be known for analyzing various media. The function image repository 302 may also include a confidence score classifier or model 326, which may have or include a variety of sub components or models, such as an artifact score model 328, an identification score model 330, an archival score model 332, a provenance model 334, and/or one or more other evaluation models 336.

In some cases, one or more functions from the function image repository 302 may be selected for analyzing the media based on one or more characteristics of the media or related information. For example, certain functions may be selected based on the media type (e.g., image, video, audio, or text). In another example, certain functions may be selected based on whether source media is available or whether contextual media is available or can be identified. In some cases, the media analyzer and evaluator 116 and/or the analysis and evaluation fleet may determine or select an appropriate function mapping based on the media or what related media is available.

The warp detector function 304, for example, may include one or more neural networks (e.g., convolutional neural networks) trained on other images and video to detect when certain aspects of an image or video has been warped. Warping has generally been used to modify an individual to change a facial expression or facial feature, to make an individual appear slimmer, and similar types of changes that are prevalent in social media, for example. The warp detector function 304 may be a trained model, for example, by storing whether a human operator has identified prior images or videos as being warped. This function may receive the image or video media type, compare it to a number of prior trials contained within the warp detector model, and output a result as to whether the image or video has been warped, to what extent, and a location within the media of the occurrence of occurrences of warping. In some cases, the wrap detector function 304 may also provide an indication as to a confidence that the model determine warping was performed on the media (e.g., on a scale for 0-100). In some aspects, the output may simply be whether the media has been modified by warping. This output (either simply binary or more detailed), may then be used by the artifact score model 328 to determine an artifact score as an input to an overall confidence of the media, as will be described in greater detail below.

The cropping detector function 306, for example, may analyze media, such as images and video, to determine if there ae any pixel inconsistencies that would indicate cropping a portion of one image or video into another image or video. In some cases, the cropping detector function 305 may employ known edge detection techniques to determine locations where cropping is most likely to occur in an image for example, by detecting when there are discontinuities in depth, surface orientation, change in illumination, etc. In some aspects, the cropping detector may identify noise in portions of the media, such as generated or associated with a media capture device. The absence of this particular type of noise may be detected and used to determine if one or more portions of the media have been cropped and replaced with other, misleading media. The cropping detector function 306 may output a simple determination as to whether media has been cropped, or may indicate where the media has been cropped, an indication of how much of the media has been cropped, and an indication of the confidence of that determination (e.g., 0-100).

The global filter detector function 308, may analyze an image or vide media type to determine if a majority of pixels in the image have been modified in color, illumination, etc., to determine if a global filter has been applied to an image or video. This may include utilizing a variety of techniques known in the art, either by comparing source media to supplied media or by analysis of the supplied media alone. The global filter detector function 308 may output a simple indication of whether a global filter has been applied, an indication of extent to which the global filter has modified the media, and/or a confidence in whether a global filter has been applied.

The local filter detector function 310, may operate in a similar manner as the global filter detector function 308, just on a more granular basis. In some aspects, the local filter detector function 310 may utilize edge detection, segmentation and other techniques known in the art. The local filter detector function 310 may output a simple indication of whether a local filter has been applied, an indication of extent to which the local filter or filters have modified the media, location information of where in the media the filter(s) have been applied, and/or a confidence in whether a local filter has been applied.

In some aspects, the outputs of the warp detector function 304, cropping detector function 306, global filter detector function 308, and local filter detector function 310 may be sent or communicational to the artifact score model 328. The artifact score model 328 may compile the various results and determine a combined indication of inconsistencies found in the media. In some cases, the artifact score model 328 may use a rules based approach to generate an artifact score that indicates what extent the media contains inconsistencies which may be misleading. For example, the artifact score model 328 may determine a certain artifact score indicating significant inconsistencies based on no warp detection results found, no filters applied, but cropping of more than 15% of the image. The artifact score may take any of a number of numerical forms (e.g., 01, 0-100, 100 being un-modified or no inconsistencies), or may be qualitative with one or a number of descriptors (e.g., no local edits were made here, or multiple edits were made but no pixels were moved and no cropping was detected). Other rule based examples include if a certain number of the inputs indicate inconsistencies, a certain percentage or confidence in the determination of inconsistencies, or other similar type results, then the artifact score may be a simple indication that the media is inconsistent. In some cases, the artifact score may be determined by a weighted sum of the inputs to the artifact score model 328, where the weights may be determine heuristically.

In another example, the artifact score model 328 may be a trained model, such as a neural network, random forest, etc., that maps various combinations of various indications from the warp detector function 304, cropping detector function 306, global filter detector function 308, and local filter detector function 310 to a numerical value or qualitative values (no, minimal, moderate, or significant cropping). It should be appreciated that the inputs to the artifact score model 328 are only given by way of example, and that various other outputs of functions or models may be sued to determine an artifact or similar score.

The media comparator function 312 may receive as inputs, the provided media and source media, for example, from the registered media repository 216. The media comparator function 312 may compare the media and output a results of the comparison. For example, the media comparator function 312 may compare two images on a pixel-by-pixel basis. The media comparator function 312 may then determine how many pixels of a total amount of pixels are different between the two, and output an indication of the percentage of pixels that are different. In other cases, the media comparator function 312 may compare video or audio media, via any of a variety of techniques known in the art, and output a similar type of comparison result. In some cases, the output may be a simple indication of whether the media are different. In other cases, the output may include an indication of the extent of the differences and/or a qualitative assessments of the difference or similarity between two media.

In some cases, the media comparator function 312 may provide its output to the archival score model 332. The archival score model 332 may analyze the results of the media comparator function 312 and make a determination as to whether the differences between the source media and supplied media are significant. This may include applying rules to a number, type, or area of impact of the identified differences. The area of impact may include an area in space, such as for an image, an area or portion of time for a video or audio, such as temporal space, etc. In other cases, this may include comparing the differences to one or more trained models indicating similar differences, including one or more neural networks, random forests, etc. The output of the archival score model 332 may be an archival score, which may be a simply numerical output, qualitative output, or a combination thereof.

The segmentation function 314 may receive media and divide it into a number of segments based on characteristics of the media. For example, in the case of image and video, groups of pixels may be grouped together into segments based on similar characteristics, such as using thresholding, clustering methods, edge detection, motion segmentation, and other various and known techniques to generate a set of segments of the media. In some cases, the segmentation function 314 may use edge detection techniques to detect when there are discontinuities in depth, surface orientation, change in illumination, etc., of an image and determine the boundaries of various segments using the results of edge detection. In some cases, edge detection may be applied to audio type media, for example, based on different speakers or voice patterns, different tonal qualities, and the like. In some cases, the segmentation function 314 may output information identifying the determine segments of the media, such as areas of an image that make up various segments. The object detector function 316 may receive the segments and attempt to identify objects within the segments via any of a variety of known techniques. In some examples, the object detector may compare characteristics of the media to known classifiers of objects having similar characteristics, and determine object in that manner, and output one or more object identifiers from the media.

In some aspects, the outputs of the segmentation function 314 and the object detector function 316 may be fed into other functions, such as the warp detector function 304 and the cropping detector function 306 to aid in those functions making more informed and/or accurate determinations with respect to the media. For example, the cropping detector function 306 may analyze boundaries between different segments output by the segmentation function 314 to determine if cropping has occurred in those specific areas. In another example, the warping detector function 304 may only analyze a certain class or group of classifications of certain objects for warping, such as faces, humans, etc.

In some cases, the object recognizer function 318 may obtain identified objects from the object detector function 316 and may attempt to compare those objects to other objects in other media to determine if the objects are specific to events, places, people etc., in the other media. The object recognizer function 318 may interface with the contextual media repository 214 to locate and determine similar recognized objects (e.g., a celebrity's face or a certain building or structure). The object recognizer function 318 may subsequently output the media that has been recognized to a certain degree of confidence as one or more objects, and/or tags associated with the recognized object (e.g., a person's name). In some cases, the object recognizer function 318 may also output the media used for recognition (e.g., contextual media that corresponding to the recognized object or objects). In some cases, the functionality of object detector and/or object recognizer functions 314 and 316 may be use an image or video analysis tool, such as may be called by one or more API calls, to detect and provide identifiers for objects in media.

An object comparator function 320 may receive the output from object recognizer function 318 and determine an extent to which the object matches the contextual media. This may include comparing various characteristics of an object. For example, in the case of a person, the object comparator function 320 may look at facial features (shapes, distances, etc.), gait, body shape, hair color, and so on, to determine an extent to which an object in the supplied media matches the same object in contextual media. The object comparator function 320 may output the results of the analysis as a percentage, simple indication of whether the object has been recognized, or via other forms including other various related information. In some cases, the object comparator function 320 may compile the comparisons of multiple contextual media to the supplied media, or may provide individual analysis with respect to different contextual media.

In some cases, the media comparator function 312 may extract various identifiers from the supplied media and direct a search through contextual media repository 214. The media comparator function may then obtain the contextual media back from the repository and combine the contextual media to recreate an event or subject, such as based on time stamp information, GPS coordinates, place images, other objects identified in the media, and so on, to generate an indication of how related/accurate the supplied media is to the combination of contextual media.

The output of the object comparator function 320 may be fed into the identification score model 330. The identification score model 330 may compile the results from object comparator function 320 and determine the extent to which one or more objects in the media has been identified and matches with contextual media of that corresponding object, in an identification score. In some cases this may include taking a weighted sum of a number of objects identified in the media and weighted according to the degree to which each object matches or truthfully depicts the same object in other contextual media, and/or weighted according to the percentage of the media that the object consumes or is part of (e.g., area, time, etc.). In other cases, the identification score model 330 may utilize other techniques, such as other rule based approaches, trained models, neural networks, and the like to determine an extent to which one or more objects have been identified in the media. The identification score model 330 may output the results of the analysis in an identification score to the confidence score classifier 326, to be used as an input to an overall confidence determined with respect to the supplied media. The identification score may take various forms, including a numerical score, a qualitative score, or a combination thereof.

The various other function(s) 324 may include an audio fingerprint function and other audio analysis functions as are known in the art. In the example of an audio fingerprint function, the function may determine a fingerprint or special representation of attributes of an audio file, which may enable audio files to be compared in a similar manner as images or video would be compared, such as by the media comparator function 312. In other examples, other function 324 may include a synchronization detection component, for example, that can match video with audio to detect if either has been modified, such as by detecting an offset in lip movements and the like.

In some cases, the confidence score classifier 326 may also include a provenance model 334. The provenance model 334 may obtain source publication information, such as corresponding to the first detected time the media was published, from search fleet 210. In some aspects, the provenance model 334 may track or record into when media has been republished or reposted over a threshold number of times, which may be performed in conjunction with the search fleet 210 and/or the contextual media repository 214. In some aspects, the provenance model 334 may track and generate a record of the history of publication of the media. In some cases, the media may be registered as source media, and the media analysis system may track reoccurrences of the media and record various information about each occurrence of the media. This may include tracking time it was published, where it was published (e.g., IP address), type of location it was published (news media, social networking, etc.), any changes made to the media each time it was published, views or likes of the media when published, etc. This information may be compiled into a history and used to generate the provenance or history record. In some cases, the history record may also be made accessible to a customer looking to obtain a confidence score in media, for example via a selectable option to view the publication history of the media.

The confidence score classifier or model 326 may receive various inputs from the outputs of one or more of the functions described above, and output a representation of a significance of differences between the media file and a source media file, inconsistencies within the media file itself, trustworthiness based on the original publication of the media, and whether or not a subject in the media matches attributes of the same subject in other media. In some aspects, the confidence score classifier 326 may determine the output of the confidence score for a particular media based on one or more outputs from the artifact score model 328, the identification score model 330, the archival score model 332, and/or other score models 336. The output of the confidence score classifier 326 may take a variety of forms, including a numerical confidence score, a qualitative confidence score (e.g., fake or untrustworthy up to matches verified source media), or a combination thereof. In other aspects, the output confidence score or indication may also include more or additional detail, such as the outputs of one or more of the artifact score model 328, the identification score model 330, the archival score model 332, and/or the provenance model or other score models 336. In some cases, if there is one determining factor in a confidence score determination, only information relating to that determination may be provided as an output from the confidence score classifier 326. In yet some instances, information of the inconsistencies within the media file and/or the differences between the media and source media or contextual media, may also be output, and for example, used to generate a graphical representation of those inconsistencies and differences, such as by the UI generator fleet 208, to output a graphical user interface, such as interface 400 or 500 described below in reference to FIGS. 4 and 5.

In some aspects, the confidence score classifier 326 may utilize and/or include a set of rules that will determine the output of the confidence score for a particular media based on inputs from the models 328-336. For example, a low confidence score may be output if at least one of the media contains a certain percentage of artifacts (e.g., as indicated by the artifact score from the artifact score model 328) or the identification score indicates that an object in the media is a public figure but that the media does not match contextual media of the public figures to a threshold extent (e.g., identification score from the identification score model 330).

In other cases, the confidence score classifier 326 may include one or more trained models that identify a confidence score for media, based on obtained or utilize human input. In some cases, the confidence score classifier may include one or more neural networks, such as a decision tree or random forest model that may take a number of qualitative inputs and map them through a random forest to determine a confidence score. This may include mapping a low confidence score to a certain public figure, a certain first media source where the media was first published, and a percentage of type of artifacts identified within the media. In some aspects, one or more of the above-described models may be trained in human input as to whether certain modifications or inconsistencies of certain media types are perceived as misleading with appropriate labeling. In some aspects each type on inconsistency and difference may have its own label to enable a more granular evaluation and classification system to be implemented. In these examples, the confidence score may indicate to what extent any differences or inconsistencies in the media would be misleading. In some examples, the confidence score or other score outputs from one or more of models 328-336 may be in the form of Boolean classifiers, soft max output including different potential outputs with corresponding probability of those results, and/or one or more vectors indicating a distance between media being accurate and not misleading, or distance to a source or other contextual media.

In some cases, the resolution of an image or video type of media may impact or affect the determination of the confidence score by the confidence score classifier 326. For example, if an image having a high resolution is analyzed and minimal inconsistencies and/or differences between the media and source media are identified, a higher confidence score may be assigned to that media because it is less likely that any other changes have been made to the media, as they would have been detected in a higher resolution media. Conversely, if media has a relatively low resolution, it could be harder to detect alterations to the media. In some cases, resolution of the media may be provided with the media, or may be determined by the media analysis service. In yet some cases, one or more functions 304-324 may be impacted by a resolution determination. For example, if media is found to have a higher resolution, fewer functions (or different functions) may be performed to analyze the media, as differences and inconsistencies in the media may be more readily determined.

In some cases one or models utilized by the confidence score classifier 326 may be programmed with or associated with a certain bias (such as erring on the side of finding any modifications to media as misleading, or the opposite, for example). In some aspects, a customer or user may configure, calibrate, or select a bias, such as by identifying sample media as misleading or non-misleading in view of source media.

In some aspects, functions may be selected or generated to detect specific modifications to media based on specific functions that are used to modify the media. For example, if a new feature in a photo editing application is released, a function or model to detect that specific modification may be developed and added to the function image repository.

It should be appreciated that the above models and functions, and mapping there between, and the ways in which the results of those models and functions are combined, is only given by way of illustrative example. Similar or different media analysis functions, models, neural networks, and other machine learning techniques may be combined in similar and different ways to output a confidence score or identification of confidence to a similar affect.

Figure 4:
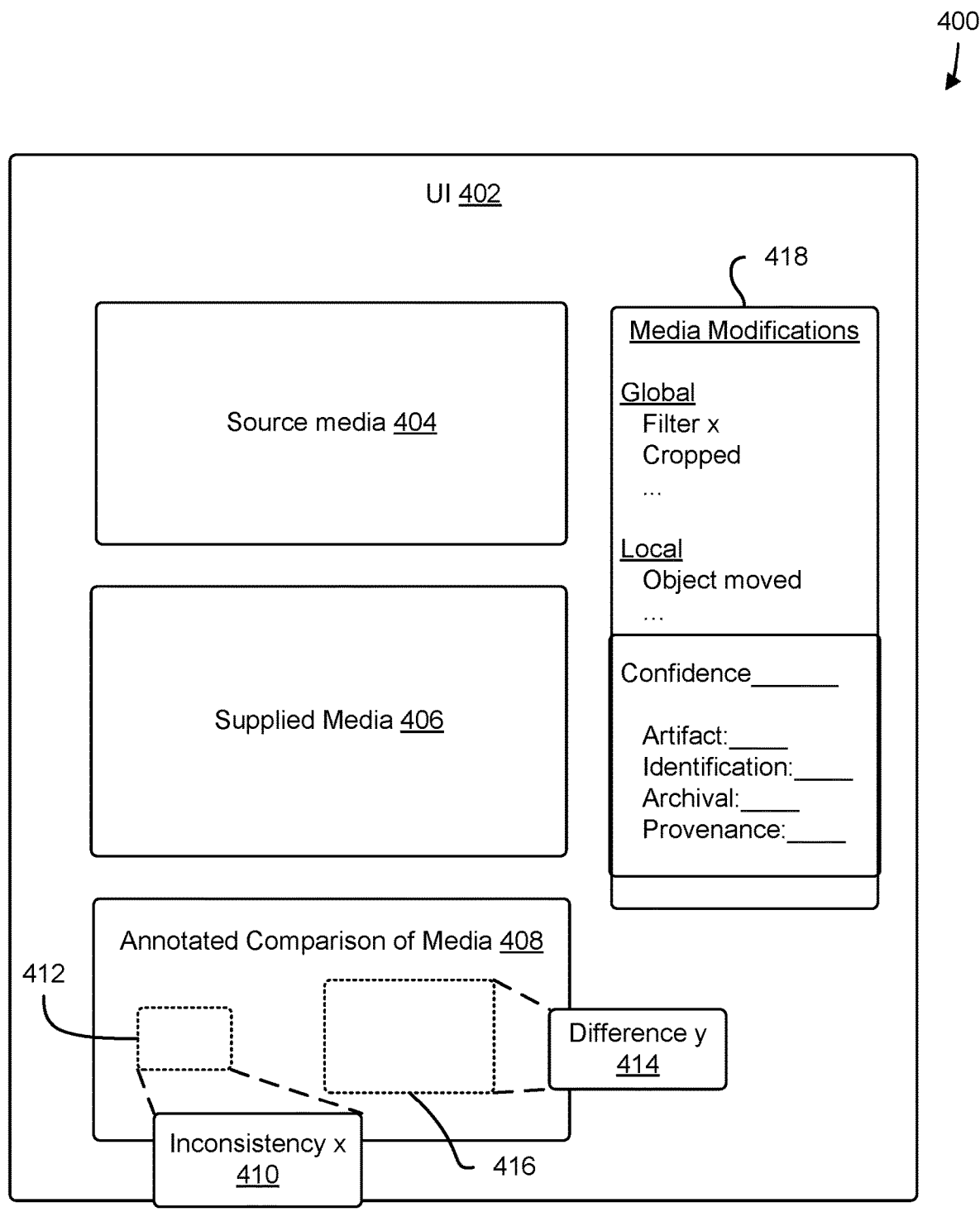
FIGS. 4 and 5 illustrate example graphical indications of results of media analyses in graphical user interfaces.

FIG. 4 illustrates an example 400 of a graphical user interface 402 that includes graphical indications of media analyses and the significance of the modifications. Graphical user interface 402 may be generated by the UI generate fleet 208, and or may display a confidence score of a media analysis, such as may be output by the analysis and evaluation fleet 206 or the confidence score classifier 326 described above in reference to FIGS. 2 and 3.

As illustrated in FIG. 4, UI 402 may display a representation of the source media 404, such as in the case registered source media is found that corresponds to the supplied media. In some aspects, the source media 404 may also be a representation of source media that was found via searching one or number of media publications, that substantially corresponds to supplied media (e.g., above a threshold of correspondence, such as 50, 60, 75, 80, 90%). In addition to the source media 404, the supplied media to be analyzed 406 may also be displayed. In addition, an annotated version of at least one of the source or supplied media, 404 or 406, may also be displayed as annotated media 408. The annotated media 408 may include visual indications of differences between the supplied media 404 and the source media 404, indicated by a visual outline 416 (e.g., a spacial outline such as a line, box, circle, or three-dimension shape within an image or video, or a box or other shape in a two-dimensional representation of an audio file, etc.) of the portions of the media that are different 414. In some aspects, inconsistencies 410 within the media itself (e.g., not compared to the source media), may also similarly be visually indicated relative to one or more portions 412 of the media. In some aspects, different types of differences may be indicated in different ways, such as coloring the outline of the portions affected by different types of differences in different ways, using dashes, dot, or other non-color differentiators, shapes, and so on. In this way, the graphical user interface 402 may more readily convey a multitude of different information in an easily accessible and easily understandable way, such that more information about the media is conveyed in a clearer way in less time.

In some cases, annotated media 408 may take the form of an image, where the supplied media 406 is also an image, a video if the source media is a video, and so on. In some cases, a video or animated display of difference between an image, a video, an audio, or other type of media and a corresponding source, and/or differences within the media itself may be generated automatically to illustrate the differences and/or inconsistencies in the media in a more intuitive way.

In some aspects, a dialogue box or other area 418 may be generated and displayed proximate to at least one of the source media 404, supplied media 406, and/or annotated media 408, to textually indicate the differences between the media, such as global and local differences or inconsistencies, and/or information of one or more confidence scores associated with the supplied media. As contemplated herein, the dialogue box may be configured to display any information generated by the confidence score classifier 326, or any sub-scoring model, such as the any of models 328-336 described above in reference to FIG. 3.

Figure 5:
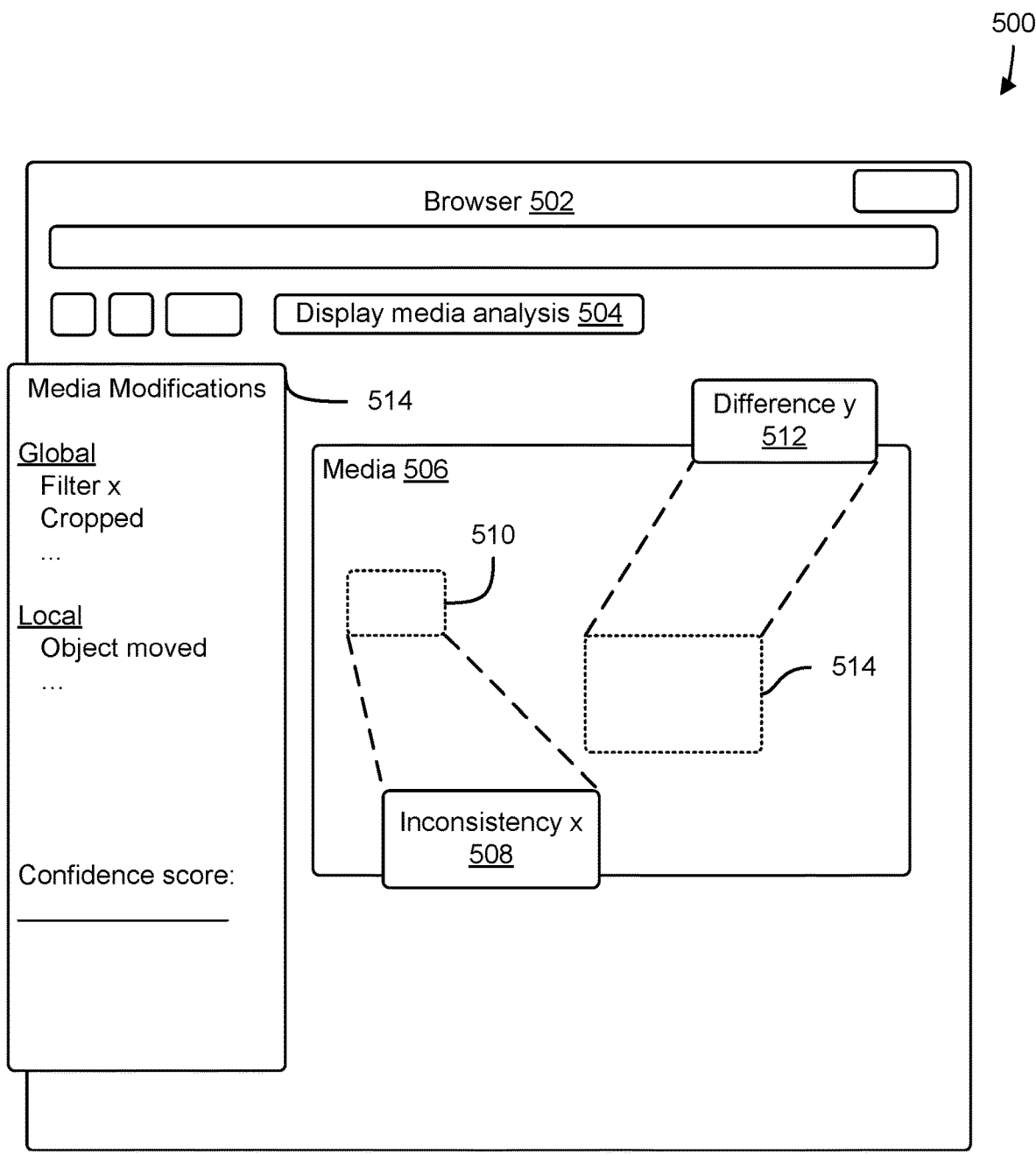

FIG. 5 illustrates another example 500 of a graphical user interface 502 that includes graphical indications of media analyses and the significance of the modifications. Graphical user interface 502 may be generated by the UI generate fleet 208, and or may display a confidence score of a media analysis, such as may be output by the analysis and evaluation fleet 206 or the confidence score classifier 326 described above in reference to FIGS. 2 and 3.

As illustrated, graphical user interface 502 may include a browser, such as provided by a web browser application. The results of media analysis, as described herein may be conveyed through existing interfaces, for example as a plug-in to an existing application, such as a web browser, or implemented in a standalone application that may interface with other application. In the example illustrated, various media 506 may be provided and displayed by a web browser 502. According to the techniques described herein, initiation of processes for analyzing media may be enabled through a selectable option, such as item 504. Upon selection, the media analysis service, as described above, may analyze selected media and output results of the analysis, for example, relative to the selected media itself. This may include visual indications of differences 512 in one or more portions 514 of the media and/or indications of inconsistencies 508 in one or more portions 510. Additionally or alternatively, textual results of the analysis of the media may be displayed in a window or dialogue space or area 514, which may include one or more aspects of dialogue box 418 described above in reference to FIG. 4.

In some aspects, only one of visual indications 508, 510, 512, 514 or textual indications 514 may be generated and displayed, to occupy less area of browser 502. In some cases, only the confidence score may be displayed, such as when a user selections to enable the media analysis function, and hovers over the media. In this example, the score may then be generated and displayed on top of the media (e.g., in a dialogue box). In some aspects, the results displayed in dialogue box or otherwise may include an attestation of the media when compared to the source. In some aspects, the amount of information provided to in an analysis of media may be dictated or controlled by the original publisher or owner of the source material.

It should be appreciated that graphical user interfaces 400 and 500 are only given by way of example. Other ways of displaying the media analysis results, visual indications of differences and inconsistencies relative to media are contemplated herein. In other examples, the UiI502 may be provided as a plugin to another application, such as a social media application.

Figure 6:
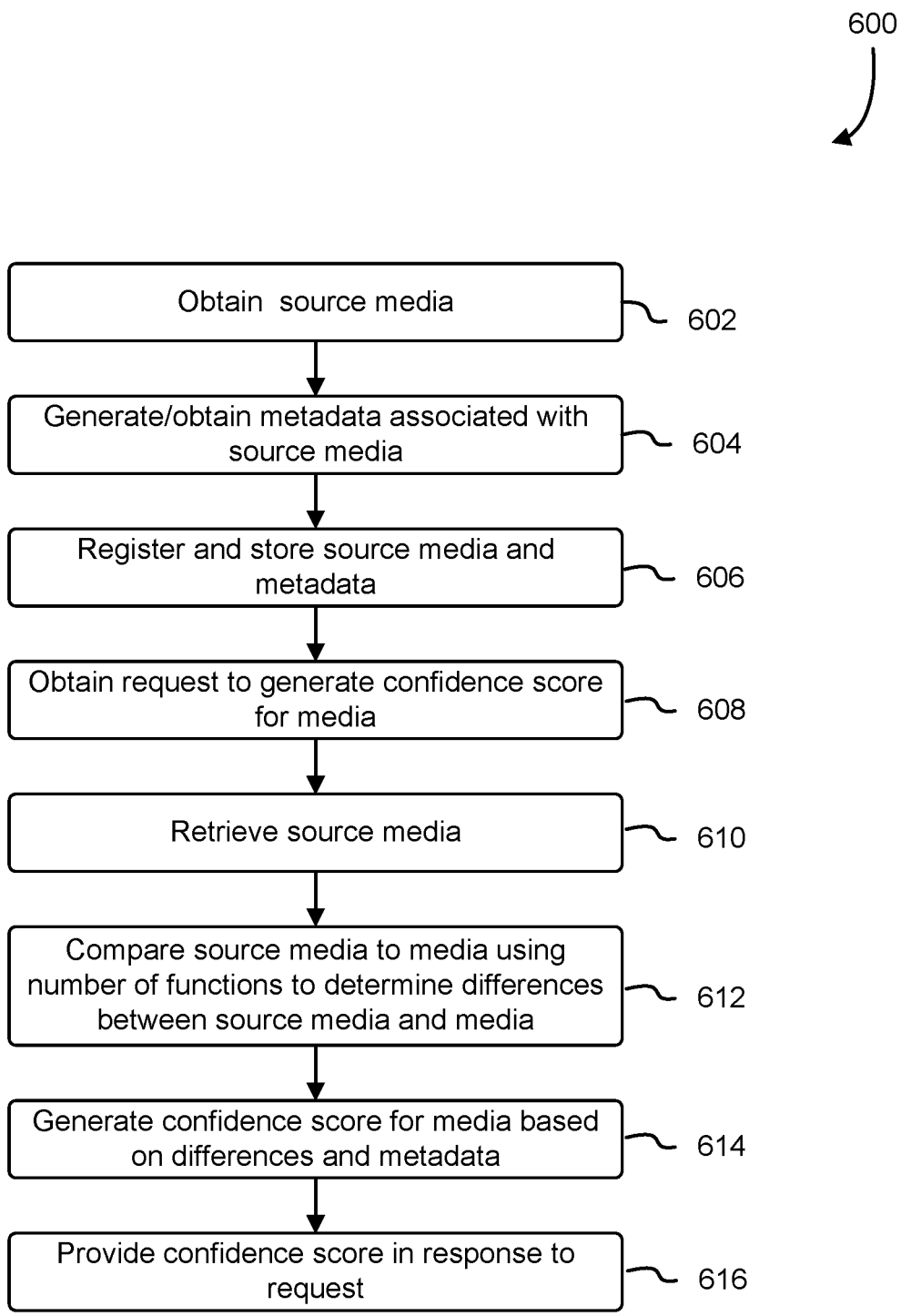
FIG. 6 illustrates an example process for registering and comparing source media to supplied media to generate a confidence score in the supplied media.

FIG. 6 illustrates an example process 600 for registering and comparing source media to supplied media to generate a confidence score in the supplied media. In some examples, process 600 may be performed by one or more of the media analysis service 110, 202, the media registration component 112, and the media analyzer and evaluator 116, of FIGS. 1, 2, and 3, and/or may generate one or more graphical user interfaces, such as graphical use interfaces 400 and 500 described in reference to FIGS. 4 and 5. It should be appreciated that as used in this disclosure dotted lines may indicate optional, but not required operations, such that the described processes may be performed without the optional operations.

Process 600 may begin at operation 602, in which source media may be obtained, for example, by a media analysis service. In some cases, the source media may be obtained with or associated with a request to register the source media with the media analysis service. In some cases, the actual source media may be obtained (e.g., in various file formats for images, video, audio, text, etc.), or a link to the media may be received, such that the media analysis service can access the media through the link. Next, at operation 604, the media analysis service may obtain metadata of the media, including one or more of time stamp information, tags or identifiers of subject in the media, media capture device information, and other similar information pertaining the media. In some cases, additionally or alliteratively, the media analysis service may generate metadata of the media, such as by utilize a media analysis tool to identify tags or identifiers (names, places, events, etc.) of the media. In some cases, the media analysis service may generate a cryptographic hash of the media that can be used at a later time to verify other copies of the media match or substantially match the source media. Yet in some cases, any other type of digest of the media may be generated and stored in addition to or instead of the media itself.

At operation 606, the media and metadata (and/or the digest, hash, etc.,) may be registered to a source or customer account and stored in data storage, such as by utilizing a data storage service, stored in a media store or registered media repository, etc. In some cases, one or modifications may be made to the media, and the modified media may be stored. In this example, uniform identifiers or unique patterns, sounds, images, pixels, etc. may be inserted into the media in a uniform way or in particular areas or portions of the media of interest (e.g., a face in an image or video). These inserted portions may then enable more efficient identification of modified version of the media, by only requiring a simple comparison to identify if portions of the media have been modified and thus do not contain the inserted portions in the expected way.

At any time after registration, the media analysis service may obtain a request to generate a confidence score of the supplied media, at operation 608. In some cases, the request may be a specific request from a customer, such that may include the media or a link to the media. In other cases the request may be received through a section in a web browser or other application that requests analysis of media. In yet other cases, the media may be identified by the media analysis service itself, for example, upon a periodic or event driven search of one or more media publications, such as may be requested by a customer as a monitoring service.

The media analysis service may search for and obtain source media that corresponding to the supplied media, at operation 610. The searching may include reverse image type searching, identifier or tag based searching, source searching, and publication location searching, and so on. In this example, the media analysis service may search for registered media. However, in other examples, the media analysis service may search any of a number of publicly available news or other media publication websites, news feeds, and the like. The case where source media is not found by the media analysis service will be discussed in greater detail below.

The media analysis may then compare the source media to the supplied media using one or more different functions to determine differences between the source media and the supplied media, at operation 612. This may include utilizing any of a number of functions, such as any or multiple of functions 304-324 described above in reference to FIG. 3. In some cases, only a media comparator function may be utilized, for example, when the source and supplied media are determined to be above a threshold percentage similar. In other cases, more functions may be utilized, for example, when the confidence of a media comparison is below a threshold, or higher confidence in the comparison is desired (e.g., such as utilizing contextual media and other ways as described in more detail above).

Based on the comparison, a confidence score may be generated for the supplied media that indicates differences between the supplied media and the registered source media, at operation 614. In some cases, the confidence score may be generated by a confidence score classifier, such as classifier 326 described above in reference to FIG. 3, which may take into account any of an artifact score, an identification score, an archival score, or other score. The confidence score may take any of a number of forms, including a simple numerical indication (0-100), a qualitative score (similar, or identical), or a combination thereof. In some cases the confidence score may also include other detail as to underlying scores the confidence score is based on and the like. The confidence score may then be provided in response to the request, at operation 616, such as through a graphical user interface.

Figure 7:
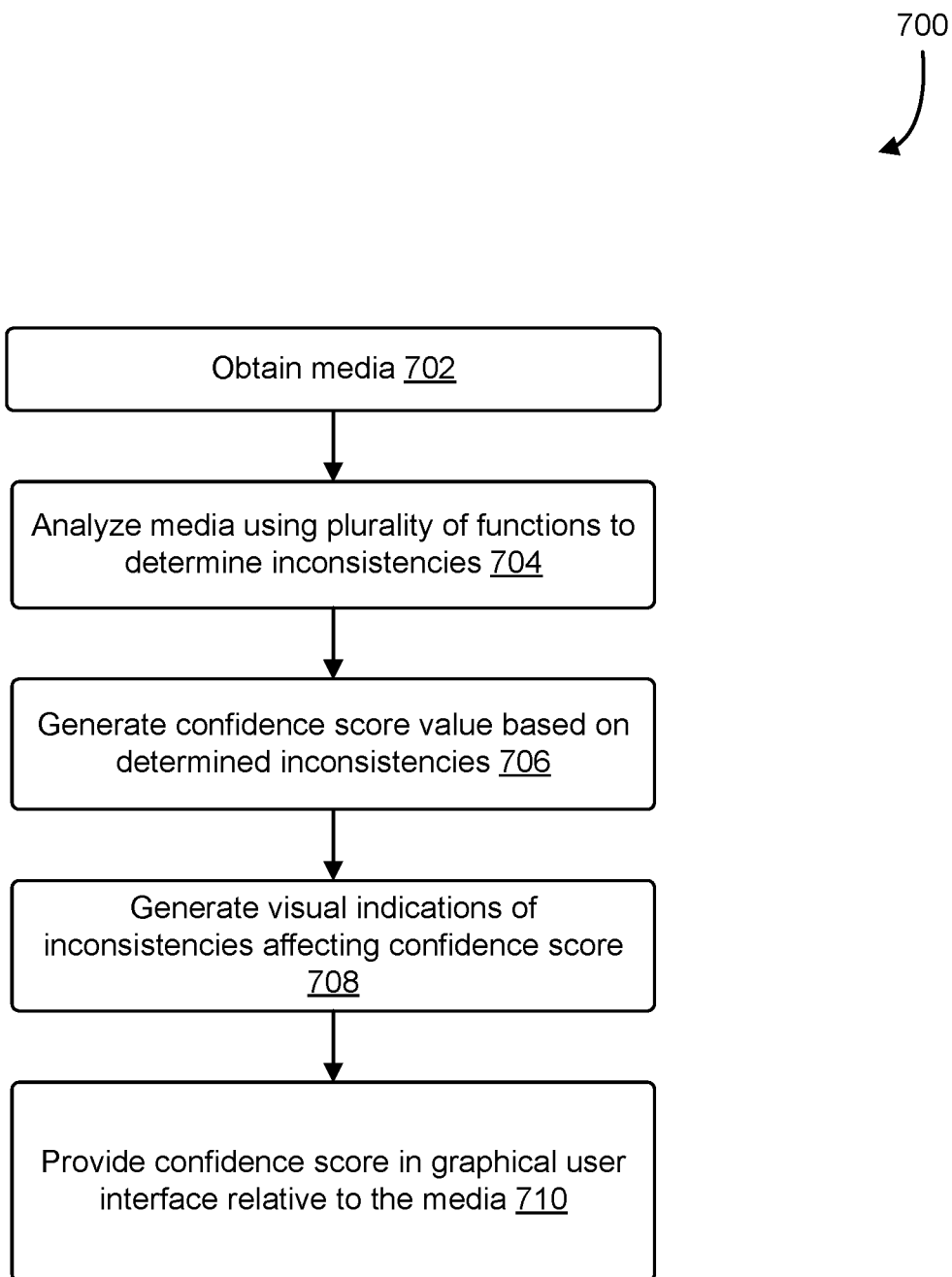
FIG. 7 illustrates an example process for determining inconsistencies within media and providing a confidence score in the media based on the inconsistencies.

FIG. 7 illustrates an example process 700 for determining inconsistencies within media and providing a confidence score in the media based on the inconsistencies. In some examples, process 700 may be performed by one or more of the media analysis service 110, 202, the media registration component 112, and the media analyzer and evaluator 116, of FIGS. 1, 2, and 3, and/or may generate one or more graphical user interfaces, such as graphical use interfaces 400 and 500 described in reference to FIGS. 4 and 5.

Process 700 may be performed when no registered media is available, and/or when no other contextual media is available. In other cases, process 700 may be performed when registered or contextual media is obtained to increase the confidence in the confidence score determination. As illustrated, process 700 may begin at operation 702, in which media for analysis may be obtained, for example, by a media analysis service. Operation 702 may include one or more aspects of operation 602, which will not be repeated again here.

Next, at operation 704, the media analysis service may analyze the media using any of a number of functions to determine inconsistencies within the media, such as one or more of functions 304-324 described above in reference to FIG. 3. The outputs of the functions may be sent to one or more classifiers, such as the confidence score classifier 326 described above in reference to FIG. 3, to determine and generate a confidence score based on the inconsistencies, at operation 706. In some cases, visual indications of the determined inconsistencies of the supplied media may be generated at operation 708. In some cases, visual indications of all the inconsistencies may be generated, or just a subset, such as only including the most relevant to the confidence score. Next, at operation 710, the confidence score and the visual indications may be provided in a graphical user interface relative to the supplied media. In some cases, this may include generating one of UI 400 or UI 500 described above in reference to FIGS. 4 and 5.

Figure 8:
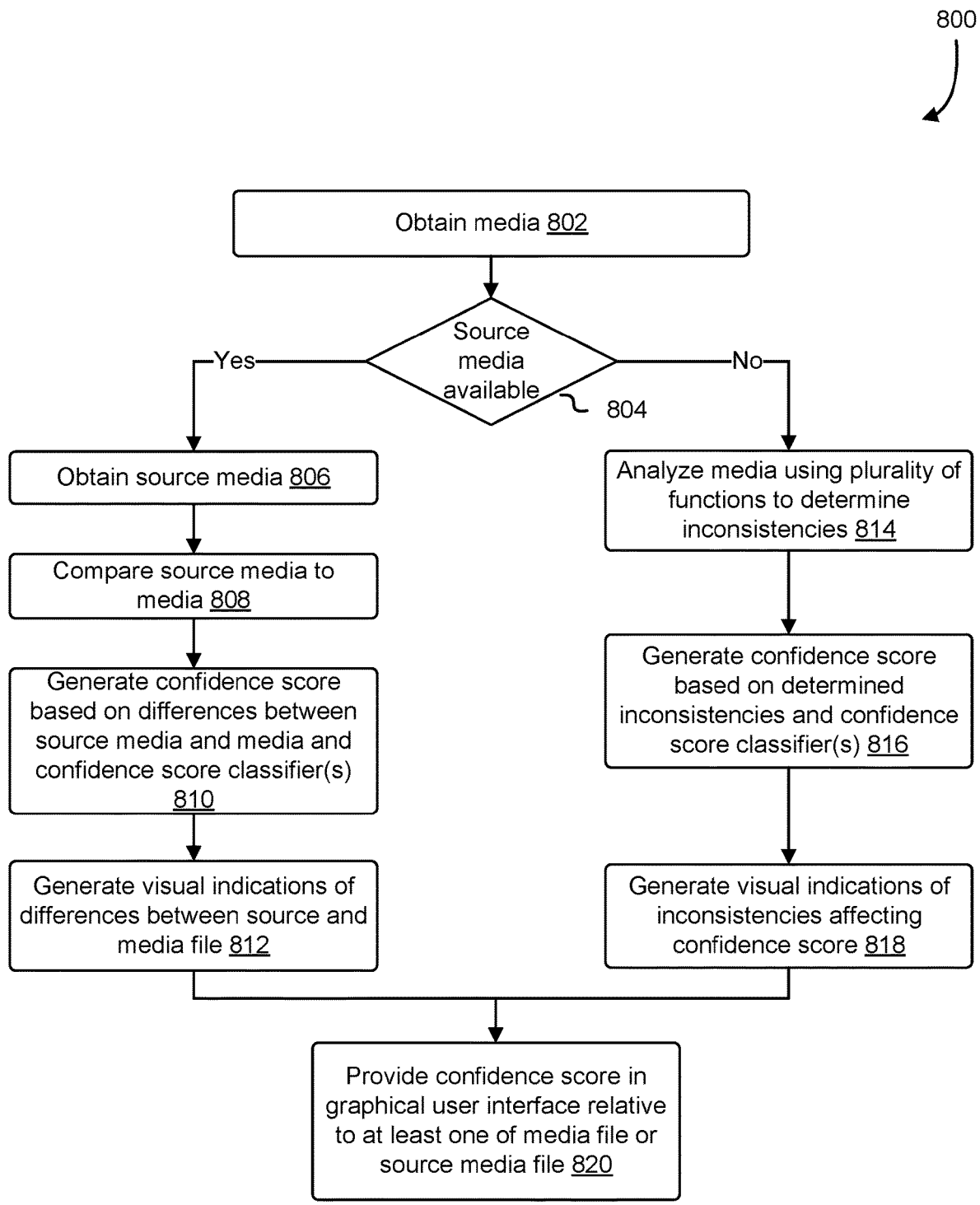
FIG. 8 illustrates an example process for generating a confidence score in media.

FIG. 8 illustrates an example process 800 for generating a confidence score in media. In some examples, process 800 may be performed by one or more of the media analysis service 110, 202, the media registration component 112, and the media analyzer and evaluator 116, of FIGS. 1, 2, and 3, and/or may generate one or more graphical user interfaces, such as graphical user interfaces 400 and 500 described in reference to FIGS. 4 and 5.

Process 800 may include one of a number of contemplated function selection criteria for analyzing supplied media. In the example illustrated, different processes may be mapped to different functions based on whether source media is available. In other cases, other selection criteria may be used, such based on a speed or efficiency (as may be selected by the customer of the media analysis service), whether an important figure or event is identified in the media, based on configurable selection of the functions themselves, and other criteria.

As illustrated, process 800 may begin at operation 802, in which media may be obtained. Next, at operation 804, it may be determined whether source media is available that corresponds to the supplied media. In some cases this may include determining if registered source media is available, contextual media is available, or a combination thereof. If source media is not available, process 800 may continue to operations 814, 816, 818 and 820, which may correspond to or include aspects of operations 704, 706, 708, and 710 described above in reference to FIG. 7. If source media is available, process 800 may proceed to operations 804, 806, and 810, which may correspond to or include aspects of operations 610, 612, and 614 described above in reference to FIG. 6. In some aspects, visual indications of the differences between the source media and supplied media may be generated at operation 812. In some aspects, process 800 may then proceed to operations 814-818, before proceeding to operation 820, where the confidence score and visual indications may be provided through a graphical user interface, such as graphical user interfaces 400 and 500 described in reference to FIGS. 4 and 5.

Figure 9:
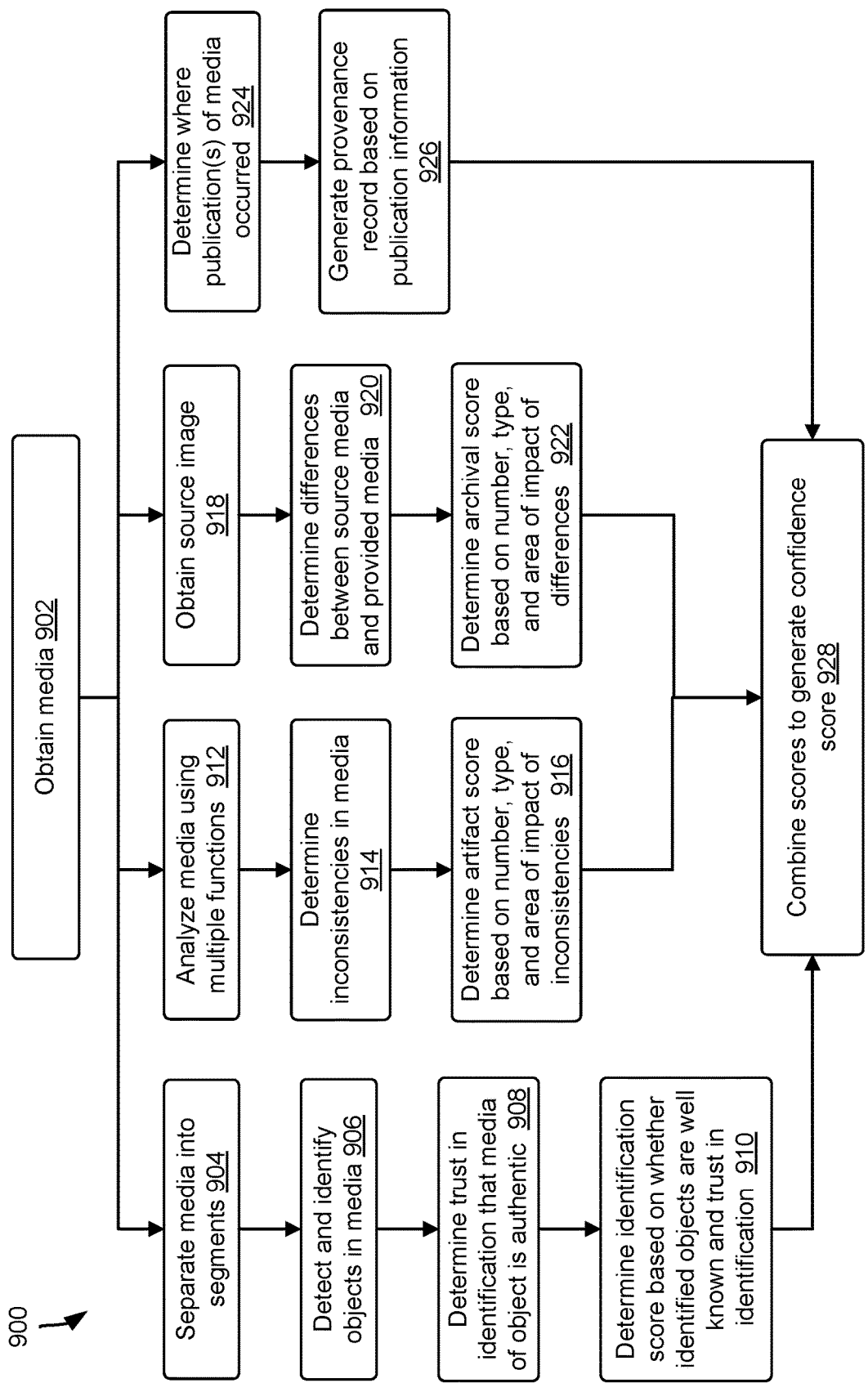
FIG. 9 illustrates another example process for generating a confidence score in media.

FIG. 9 illustrates another example process 900 for generating a confidence score in media. In some examples, process 900 may be performed by one or more of the media analysis service 110, 202, the media registration component 112, and the media analyzer and evaluator 116, of FIGS. 1, 2, and 3, may utilize one or more of functions 304-324 and generate a confidence score using models 326-336 of FIG. 3, and/or may generate one or more graphical user interfaces, such as graphical use interfaces 400 and 500 described in reference to FIGS. 4 and 5.

Process 900 may include three different process mappings for generating an identification score (operations 904-910), an artifact score (912-916), and an archival score (operations 918-922), which may be combined to generate a confidence score in supplied media. In some cases, one or multiple of the process mappings may be performed, depending on what information is available, the type of media supplied, on a selection from a customer, and so on. In some aspects, another process mapping may include generating a provenance record or publication history of media, as represented by operations 924-926.

An example process for determining an identification score may include separating media into segments at operation 904, detecting and identifying objects in the media at operation 906, determining a trust value in the identification that media of object is authentic, and determining an identification sore based on the trust value, as described in more detail above in reference to FIG. 3. In some aspects, the identification score may be additionally based on whether the object(s) identified in the media are well known. This may change the score, for example, by requiring a higher level of trust value in the well-known object to detect more subtly changes in the media.

An example process for determining an artifact score may include analyzing media using a number of functions, such as a cropping detector function, warping functions, and the like, at operation 912 and using the output of those functions to determine inconsistencies in the media, at operation 914. An artifact score may then be determined, at operation 914, based on the number, type, and/or area of impact of the inconsistencies. This may include weighting different inconsistences based on one of what type they are (cropping would be weighted to a greater extent than global filtering), and how much area they affect or what are they affect (e.g., based on percentage area or based on identified portions, such as a face).

An example process for determining an archival score may include obtaining corresponding source media (either registered on not registered) at operation 918, and determining differences between the source media and the supplied media at operation 920. The archival score may then be generated based on the number, type, and/or area of impact off the differences, at operation 922. This may include weighting different differences based on one of what type they are (lighting, color, etc.), and how much area they affect or what are they affect (e.g., based on percentage area or based on identified portions, such as a face).

An example process for determining a provenance record may include determining where publication or publications (e.g., IP addresses) of the media occurred at operation 924. In some aspects, operation 924 may also include determining or tracking changes of the media between different publications, and related information, such as time of publication, etc. The provenance record may then be compiled or generated at operation 926. In some cases, the provenance record may include addresses of where the media was published, when the media was published at each address, and various forms of indications of changes made to the media throughout multiple publications, One or more of the identification score, artifact score, and archival score may then be combined to generate a confidence score, at operation 928. In some aspects, the provenance record may also be provided with the confidence score, at operation 928.

Figure 10:
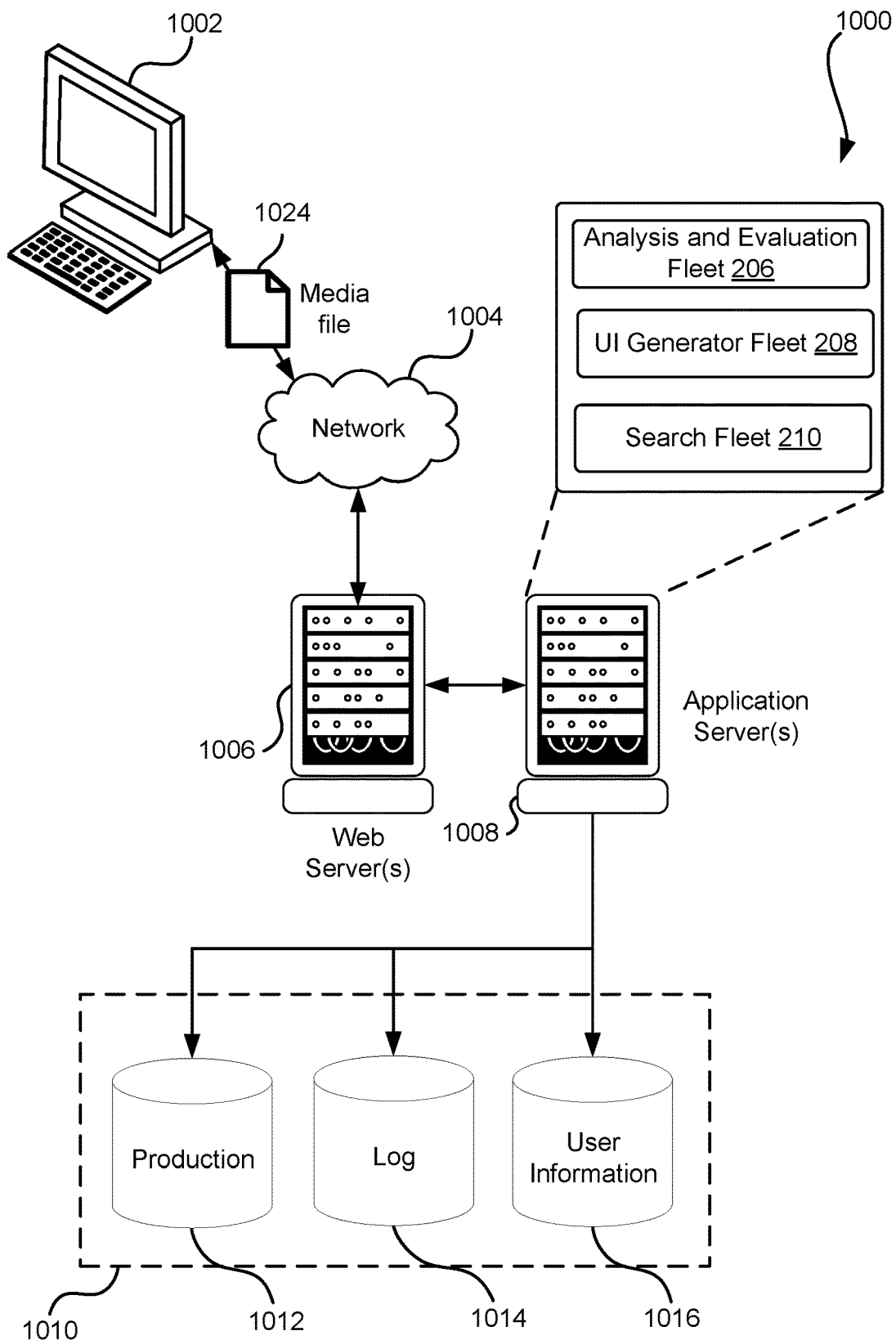
FIG. 10 illustrates an environment in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate structured language in this example. In an embodiment, operations described herein as being performed by a single device are performed collectively by multiple devices that form a distributed and/or virtual system.

As described herein, client device 1002 may send media 1024 to a web server 1006 and application server 1008 of computing resource service provider. The application server 1008 may host and provide a media analysis service, such as service 110, 202 described above, which may include or interact with web servers 1006, analysis and evaluation fleet 206, a UI generator fleet 208, and a search fleet 210, as may be examples of web server fleet 204, analysis and evaluation fleet 206, user interface generator fleet 208, and a search fleet 210 described above in reference to FIG. 2.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as function image information and access rights information (e.g., access control policies or other encodings of permissions) are stored in the data store in any of the above listed mechanisms as appropriate or in additional mechanisms in the data store 1010.

In some aspects, the data store 1010 may host or provide various repositories for use by web server 1006 and application server 1008 hosting the media analysis service, such as a function image repository 212, a contextual media repository 214, a registered repository 216, and other repository 218 as described above in reference to FIG. 2.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory with instructions that, as a result of being executed by the one or more processors, cause the system to at least:
obtain a media file at a computing resource service provider;
obtain a source media file corresponding to the media file;
compare the media file to the source media file to generate a plurality of media comparisons that indicate differences between the media file and the source media file;
generate an archival score that indicates an importance of differences between the source media file and the media file based on compiling the plurality of media comparisons;
analyze data only contained within the media file itself to generate media results that indicate inconsistencies within the media file, the inconsistencies indicative of at least one visual or audio modification made to produce the media file;
generate an artifact score that indicates an importance of the inconsistencies within the media file based on the media results; and
generate and provide through a graphical user interface a confidence score of the media file by combining the archival score and the artifact score, wherein the confidence score indicates a trustworthiness of the media file, and wherein the graphical user interface visually indicates the differences between the source media file and the media file relative to at least one of the media file or the source media file.

2. The system of claim 1, wherein the instructions, as a result of being executed by the one or more processors, further cause the system to at least:
detect, recognize, and identify a subject in the media file;
compare the subject in the media file to the subject in at least one other media file to generate a subject comparison; and
determine an identification score based on the subject comparison that indicates a similarity between the subject in the media file and the subject in the at least one other media file, wherein generating the confidence score is further based on the identification score.

3. The system of claim 1, wherein the instructions, as a result of being executed by the one or more processors, further cause the system to at least:
determine a publication history of the media file; and
provide the publication history through the graphical interface.

4. The system of claim 1, wherein at least one of the importance of differences between the source media file and the media file or the importance of the inconsistencies within the media file is determined heuristically.

5. A computer-implemented method, comprising:
obtaining a media file at a computing resource service provider;
analyzing data within the media file to generate media results that indicate inconsistencies within the media file, the inconsistencies indicative of at least one modification to produce the media file, the data obtained from the media file itself;
generating an artifact score that indicates an importance of the inconsistencies within the media file based on the media results;
evaluating the media file based on at least one of a content of the media file or availability of a corresponding source media file to generate an additional score, by:
comparing the media file to a source media file that corresponds to the media file to generate a plurality of media comparisons that indicate differences between the media file and the source media file; and
generating an archival score that indicates an importance of differences between the source media file and the media file based on compiling the plurality of media comparisons;
generating and providing a confidence score that indicates at least one of trustworthiness or authenticity of the media file based on the artifact score and the additional score; and
visually indicating the differences between the source media file and the media file relative to at least one of the media file or the source media file in a graphical user interface.

6. The computer-implemented method of claim 5, wherein generating the artifact score further comprises:
   determining at least one of a number, type, or area of impact of at least one inconsistency of the inconsistences within the media file to generate the artifact score.

7. The computer-implemented method of claim 5, wherein evaluating the media file to generate the additional score further comprising:
   obtaining the source media file that corresponds to the media file.

8. The computer-implemented method of claim 7, wherein obtaining the source media file further comprises searching a data storage service, provided by the computing resource service provider, that maintains a plurality of source media files, for the source media file.

9. The computer-implemented method of claim 5, wherein evaluating the media file to generate the additional score further comprises:
   identifying a subject in the media file;
   comparing the subject in the media file to the subject in at least one other media file to generate a subject comparison; and
   determining an identification score based on the subject comparison, wherein generating the confidence score is further based on the identification score.

10. The computer-implemented method of claim 5 further comprising:
    determining publication information of the media file, wherein the publication information comprises a location of a first publication of the media file or a corresponding media file; and
    providing the publication information with the confidence score.

11. The computer-implemented method of claim 5, wherein evaluating the media file to generate the additional score further comprises:
    evaluating the media file based on the content of the media file;
    comparing the media file with the corresponding source media file; and
    evaluating the publication information of the media file or the corresponding media file.

12. A non-transitory computer-readable storage medium storing thereon executable instructions that, as a result of being executed by one or more processors of a computer system, cause the computer system to at least:
    detect publication of a media file and obtain the media file by a computing resource service provider;
    evaluate data within the media file based on inconsistencies within the media file to generate an artifact score, wherein the inconsistencies are indicative of at least one modification to produce the media file;
    compare the media file with a corresponding source media file to generate a plurality of media results that indicate differences between the media file and the corresponding source media file;
    generate an archival score that indicates an importance of differences between the source media file and the media file based on compiling the plurality of media comparisons; and
    generate and provide a confidence score that indicates a trustworthiness of the media file based on the artifact score and the archival score through a graphical user interface, wherein the graphical user interface visually indicates one or more of the inconsistencies within the media file or differences between the corresponding source media file and the media file relative to at least one of the media file or the corresponding source media file in a graphical user interface.

13. The non-transitory computer-readable storage medium of claim 12, wherein the instructions that, as a result of being executed by the one or more processors, cause the computer system to evaluate the media file based on the inconsistencies within the media file further cause the computer system to:
    determining at least one of a number, type, or area of impact of at least one inconsistency of the inconsistences within the media file to generate the artifact score, wherein generating the confidence score is further based on the artifact score.

14. The non-transitory computer-readable storage medium of claim 12, wherein the instructions that, as a result of being executed by the one or more processors, cause the computer system to evaluate the media file based on the content of the media file further cause the computer system to:
    identify a subject in the media file;
    compare the subject in the media file to the subject in at least one contextual media file to generate a subject comparison; and
    determine an identification score based on the subject comparison, wherein generating the confidence score is further based on the identification score.

15. The non-transitory computer-readable storage medium of claim 12, wherein the instructions that, as a result of being executed by the one or more processors, cause the computer system to evaluate the media file based on the comparison of the media file with the corresponding source media file further cause the computer system to:
    generate an archival score of the media file based on at least one of a number, type, or area of impact of the differences between the media file and the corresponding source media file, wherein generating the confidence score is further based on the archival score.

16. The non-transitory computer-readable storage medium of claim 12, wherein the instructions that, as a result of being executed by the one or more processors, further cause the computer system to:
    determine publication information of the media file, wherein the publication information comprises at least one publication address of the media file or a corresponding media file; and
    provide the publication information with the confidence score.

17. The non-transitory computer-readable storage medium of claim 12, wherein the executable instructions further comprise instructions that, as a result of being executed by the one or more processors, cause the computer system to:
    provide the confidence score through a web browser application.

* * * * *